US008515785B2

(12) United States Patent
Clark et al.

(10) Patent No.: US 8,515,785 B2
(45) Date of Patent: Aug. 20, 2013

(54) CONTINGENT WELLNESS BENEFITS FOR LIFE INSURANCE

(75) Inventors: Brian J. Clark, Clive, IA (US); Rhonda R. Elming, Johnston, IA (US); Thomas A. Doruska, Ankeny, IA (US)

(73) Assignee: Aviva USA Corporation, West Des Moines, IA (US)

( * ) Notice: Subject to any disclaimer, the term of this patent is extended or adjusted under 35 U.S.C. 154(b) by 103 days.

(21) Appl. No.: 11/898,752

(22) Filed: Sep. 14, 2007

(65) Prior Publication Data

US 2008/0109263 A1    May 8, 2008

Related U.S. Application Data

(60) Provisional application No. 60/856,306, filed on Nov. 3, 2006.

(51) Int. Cl.
*G06Q 40/00* (2012.01)
(52) U.S. Cl.
USPC ............. 705/4; 705/2; 705/3; 705/36; 705/38
(58) Field of Classification Search
USPC ......................................... 705/2, 3, 4, 36, 38
See application file for complete search history.

(56) References Cited

U.S. PATENT DOCUMENTS

| | | | |
|---|---|---|---|
| 4,975,840 A | 12/1990 | DeTore et al. | |
| 5,752,236 A | 5/1998 | Sexton et al. | |
| 5,937,387 A | 8/1999 | Summerell et al. | |
| 6,014,631 A | 1/2000 | Teagarden et al. | |
| 6,021,404 A | 2/2000 | Moukheibir | |
| 6,163,770 A * | 12/2000 | Gamble et al. ................... | 705/4 |
| 6,269,339 B1 | 7/2001 | Silver | |
| 6,456,979 B1 | 9/2002 | Flagg | |
| 6,584,446 B1 | 6/2003 | Buchanan et al. | |
| 6,999,935 B2 | 2/2006 | Parankirinathan | |
| 7,319,970 B1 | 1/2008 | Simone | |
| 2002/0111827 A1* | 8/2002 | Levin et al. ....................... | 705/2 |
| 2004/0064391 A1* | 4/2004 | Lange .............................. | 705/36 |
| 2005/0038679 A1* | 2/2005 | Short ............................... | 705/2 |
| 2005/0071204 A1* | 3/2005 | Parankirinathan ................ | 705/4 |
| 2005/0108062 A1* | 5/2005 | Higgins ............................ | 705/4 |
| 2005/0261939 A1* | 11/2005 | Augspurger et al. ............. | 705/2 |
| 2006/0020539 A1* | 1/2006 | Salter .............................. | 705/38 |

(Continued)

OTHER PUBLICATIONS

Fitness Edge® poster from Indianapolis Life.

(Continued)

*Primary Examiner* — James Trammell
*Assistant Examiner* — Sanjeev Malhotra
(74) *Attorney, Agent, or Firm* — Foley & Lardner LLP

(57) ABSTRACT

A method for rewarding life insurance policy holders who satisfy requirements relating to insured individuals' wellness includes segmenting a group of insured individuals into a W group that qualifies for a wellness benefit and a S group that does not qualify for the wellness benefit. Qualification for the wellness benefit is based on compliance with one or more of said requirements relating to insured individuals' wellness. An aggregate wellness benefit pool available for distribution to members of the W group is then determined. The wellness benefits may be distributed in several forms or combinations thereof, such as cash dividends, reductions in premiums, free additional insurance coverage for a specified time period, credits towards policy cash value or increases in other benefits. The requirements relating to an insured individual's wellness may include one or more existing health (results-based) conditions or activity-based requirements, or a combination thereof.

26 Claims, 8 Drawing Sheets

(56) References Cited

U.S. PATENT DOCUMENTS

| | | |
|---|---|---|
| 2006/0064331 A1 | 3/2006 | Odermott et al. |
| 2007/0021987 A1* | 1/2007 | Binns et al. ............ 705/4 |
| 2007/0038481 A1* | 2/2007 | Darr ...................... 705/4 |
| 2007/0038482 A1* | 2/2007 | Herndon et al. ......... 705/4 |
| 2007/0214022 A1* | 9/2007 | Hagelman et al. ....... 705/4 |
| 2008/0040155 A1* | 2/2008 | Ray et al. ................ 705/2 |
| 2008/0201175 A1* | 8/2008 | Levin et al. ............. 705/3 |
| 2009/0150192 A1* | 6/2009 | Gore et al. .............. 705/4 |

OTHER PUBLICATIONS

Runners Edge® marketing piece from Indianapolis Life.
Fitness Edge® poster from Indianapolis Life; between 1997-1998.
Runners Edge® marketing piece from Indianapolis Life; between Apr. 9, 1996 and Jun. 1996.

* cited by examiner

CONTINGENT WELLNESS BENEFITS FOR LIFE INSURANCE

PRIORITY

This application claims priority to provisional application 60/856,306 filed on Nov. 3, 2006, and incorporates the entirety of the contents of that provisional herein by reference.

BACKGROUND OF THE INVENTION

1. Field of Invention

The present invention relates to life insurance products. In particular, it relates to a method for rewarding life insurance policy holders who satisfy requirements relating to insured individuals' wellness, a computer-implemented method thereof, and a computer readable storage medium for storing a set of instructions that when implemented perform such method.

2. Background and Related Art

The field of insurance broadly includes various types of insurance that can be purchased by an individual, and ranges from life insurance to health insurance to auto insurance as well as other types of property and liability coverage. The regulations and practices associated with each type of coverage vary as well, and in some cases these regulations can vary at the state level.

For example, the auto industry is substantially different from life and health insurance underwriting and pricing. Underwriting for risk and establishing a price for the coverage is established prior to issuing the policy; they also may underwrite while coverage is in force. In particular, an insurance company often monitors the insured individual's driving behavior and other factors to establish the premium. Re-pricing for the risk is done at the most granular level—the specific individual being insured. The auto insurance company has the legal right to either raise the individual's premium or cancel the coverage unilaterally. The insured always has the option to cancel the coverage and seek coverage with another insurance carrier.

Health insurance purchased by individuals has similarities to auto insurance but there are substantial differences. Underwriting for risk and establishing the premium for the coverage is also established prior to issuing the coverage. The individual is placed into a "risk class." However, once the policy is issued ongoing underwriting for risk at the insured level is prohibited and the insurance company cannot terminate coverage for any specific individual. The insurance company can only adjust premium requirements uniformly for all insured individuals in the same risk class. The insurance company can legally terminate coverage but only if they terminate coverage for all individuals in the entire class of policyholders. The insured has the option to cancel the coverage and seek new coverage, and they often do if the new coverage can be obtained under more favorable economic terms.

Individuals can also obtain health insurance coverage as a member of a group, and the coverage is typically referred to as "group health insurance." Typically the group is the employee population of an employer. In the group coverage case, there is no underwriting for risk at the individual level. The risk assessment is done at the group level considering the nature and health risk characteristics of the group. Similar to individual health insurance, the insurance company cannot cancel coverage for any specific individual level. The insurance company does have the right to cancel coverage for the entire class; in this case the class would be all the insured individuals in the group plan. Premiums are adjusted at the group level based on emerging experience.

Individuals have the ability to opt out of the group and seek individual coverage outside the group plan. Similarly, the group's decision maker has the ability to cancel the entire group's coverage if new coverage can be obtained elsewhere under more favorable terms.

Life insurance coverage can be obtained either as an individual ("individual life insurance") or as a member of a group ("group life insurance"). Similar to health insurance, the group is typically employees of an organization. Group life insurance is typically obtained on a guaranteed issue basis (i.e. no individual underwriting) with pre-determined coverage amounts (e.g. fixed amount per person or a multiple of the individual's salary) and minimal specified requirements (e.g. must have been actively at work for a specified period of time). There is no underwriting for mortality risk at the individual level; the insurance company underwrites for risk based on nature of the employer's business, demographics of the employees, etc.

Similar to group health insurance, the insurance company providing group life insurance cannot cancel the insurance coverage for any specific individual, but has the right to cancel the coverage for the entire group. However, there is a major difference from health insurance plans: the individual has the right to convert their group life coverage to an individual life policy of equal or smaller coverage without providing any evidence of insurability. In effect, healthy individuals can opt out of the group and seek individual coverage under more favorable terms. This dynamic will drive up the average expected mortality ratio for the entire group. If the group coverage gets terminated, the highest risk individuals have the strongest incentive to exercise the conversion option.

Individual life insurance coverage consists of policies covering a specified individual. Unlike group life insurance, that specific individual is underwritten for risk and the policy premiums and/or cost of insurance charges reflect the individual's risk classification. However, once the policy is issued the insurance company has no ability to require new underwriting information and thus unilaterally change the risk classification. Even if the individual applies for additional coverage (a product flexibility feature commonly available with universal life plans) and the risk classification would change to the insured's detriment, the insurance company cannot change the risk classification on the original insurance coverage. As long as the individual meets the premium requirements, the coverage cannot be canceled by the insurance company. In effect, the insured maintains all the options: if they apply for new coverage and the risk classification has improved and/or the economic terms of the new coverage are more favorable, they can exchange the old policy for the new one. If it is not more favorable, they simply decline to accept the exchange.

Thus, there is a consistent theme among the economic incentive structure for life and health insurance plans. The individuals with the best risk profile ("best risks") have the economic incentive to seek newer coverage with more favorable terms, while the individuals with the worst risk profile have the economic incentive to remain in the current plan coverage. Within the contractual limits, the insurance company may adjust their prices uniformly for all individuals in the same risk class to reflect the emerging health and/or mortality experience in order to preserve the proper balance of revenues and policyholder benefits. The more the best risks opt out of the original plan, the more likely the experience on the policies remaining will have a higher claims ratio overall. This is often referred to as "the death spiral" since insurance company efforts to raise premiums to cover the higher claims ratio may encourage the remaining best risks to opt out, driving up the claims ratio, which further encourages the remaining best risks to opt out, and so on.

There is one substantial difference in monitoring the emerging risk between the health insurance and life insurance plans. With health insurance, claims from individuals are "repeatable" since poor health can result in ongoing claims for the same illness and/or new claims for different illnesses can emerge from the same individual with a poor health profile. The insurance company cannot obtain new underwriting information on individuals but claims experience has high predictive value on future claims since the individuals generating those claims may likely remain in the group.

With life insurance, claims are obviously not "repeatable" for the individual. Once a death claim occurs, there is no ability to collect another premium from that individual and there will never be another claim. In effect, the insurance company cannot require new information on individuals to gather insight on the current state of the risk. In addition, claims experience for a group of policies has lower predictive value on future life expectancy (relative to health insurance) since everyone still in the group has never submitted a death claim. To the extent poor underwriting practices allowed some unhealthy risks into the group that resulted in higher than expected death claims, this could explain poor mortality ratios to date. However, this does not validate the remaining lives have a poor life expectancy profile because the ineffective underwriting practice could have been isolated to those individuals dying prematurely. Any effort to raise premiums and/or insurance charges, particularly without any knowledge of the health state for the remaining policyholders in the class, raises the likelihood of "the death spiral."

The life insurance industry's product types can be segmented into "participating" and "non-participating". Participating and non-participating policies have many similarities but are different in two key aspects. The first difference comes from the ownership structure of the company. Participating policies are generally sold by mutual insurance companies whereby the policyholders are technically the owners of the insurance company. There are no shareholders so the members (e.g. policyholders) do not have a means to sell that ownership or convert it to any other financial asset. Their membership or ownership status in the company's capital and surplus is effectively realized when the company "demutualizes" or converts to a stock company structure.

The second difference comes from how the policy and its inherent insurance charges are designed and managed relative to expected and emerging experience. Since the premiums and cash values of participating policies are based on guaranteed/conservative assumptions, dividends effectively represent a refund of past charges that were in excess of the guarantees. For example, whole life policies establish guaranteed premiums and guaranteed cash values based on very conservative assumptions related to mortality, interest income, and expenses. To the extent the aggregate experience of the class is more favorable than the assumptions supporting the underlying guarantee, policyholders are eligible for a dividend declared at management's discretion. Participating means the policyholders "participate" in the emerging experience of the class of business subject to the contractual guarantees and the insurance company's discretion to distribute the economic benefits of favorable experience.

It should be noted that mutual companies selling participating policies are not required by law to adjust dividend scales as experience emerges (positive or negative). In the general course of managing the business, mutual insurance companies may choose to retain favorable experience and boost corporate equity funds or redeploy those excess earnings into other lines of business. Conversely, competitive pressures may cause insurance companies to use corporate equity funds or profits from other lines of business to subsidize unfavorable experience with artificially high dividend scales.

Participating whole life policies are bought by individuals with the expectation of a dividend since consumers expect the experience to be more favorable than the conservative guarantee inherent in the premiums. Therefore the policy is sold with a projection of dividends that reflects the actual anticipated experience relative to the embedded guarantees. As the individual ages and more time passes since the underwriting was performed, the expected mortality rate increases. For two insured individuals with the same age and underwriting classification, the expected mortality rate can be substantially different if one individual's underwriting information is more dated (especially if the difference is more than 15 years, for example). The more favorable dividends are, the more consumers will be encouraged to remain in the class in general. Note, however, the long-standing traditional industry practice is to distribute the favorable claims experience to all individuals in proportion to their expected mortality cost. To the extent a specific individual's health has been maintained or improved since he/she purchased the policy (in other words, their true expected mortality based on the most current information is lower than the "expected" mortality inherent in the insurance company's pricing), the insured may find it economically advantageous to seek a new policy despite the dividend (even if the dividend is more favorable than expected). Conversely, unfavorable mortality experience and thus poor dividend payouts will increase the incentive for the individual to shop for new insurance coverage, initiating the process for the "death spiral" to begin.

Stock insurance companies are owned by shareholders and typically sell "non-participating" insurance plans. Stock companies typically offer permanent life insurance plans using the universal life chassis ("UL") where the policy has a "current cost of insurance" or "COI" and a guaranteed COI. The current COI is based on a best estimate of the mortality cost for that individual's risk class established at the time the policy was originally underwritten and issued. This expected mortality cost would be identical to that established in a participating whole life dividend scale, all else being equal. The process and underlying economics are the same. The key difference between a participating policy and a non-participating policy is the approach to establishing the charges to the consumer. The participating policy establishes a premium/charge based on the guarantee and refunds favorable experience after-the-fact via the dividend mechanism. The non-participating contracts establish the current period COI charge based on expected experience. As experience emerges, the insurance company has the legal right to raise or lower the current COI charge prospectively but they cannot retroactively change the COI charge. Furthermore, the prospective COI charge cannot exceed the contractually-guaranteed COI charge.

Managers of participating plans and non-participating UL plans face similar dilemmas when the business is showing improving or deteriorating mortality. Participating plan managers must make a macro business decision whether to pass on the claims variance (an economic variance which is applied proportionally to all policies in the class) retroactively through the declared dividend. Non-participating plan managers cannot recoup past losses but they must determine if the past experience is indicative of the prospective experience and then make a macro business decision whether to adjust the UL COI charges. In both instances, this decision is made without any new knowledge of the life expectancy profile of those insured still in the group. Similarly, each individual remaining in the plan will evaluate their current health, the net current price of the insurance coverage, and the cost of exchanging for a new policy to determine the plan most favorable to their situation.

Term life insurance provides coverage for a limited period of time in return for a specified level of premium. One insurance company developed a term insurance product with a standard premium scale but provided the individual with an opportunity to get a discount on that premium if they completed a running event (e.g. marathon, 10K run) within an age-group specific time limit for the designated distance. Designers of this policy believed that runners with the proven ability to complete the distance within the prescribed time period for their age bracket would have better mortality experience than other individuals in their respective risk class. In this term insurance plan, the premium discount was set at policy issue. The premium discount was guaranteed at issue and thus did not have any link to the emerging mortality of the block. Consequently, the company did not retain any ability to adjust the size of the reward/discount. As a result, the same economic incentive structure is resident with this runners term insurance product as with all individual life insurance products: the healthier the individual overall, the stronger the economic incentive to opt out of the current insurance contract in exchange for new insurance coverage with more favorable economic terms.

In view of the foregoing, it would be advantageous to provide an improved form of life insurance that helps avoid the "death spiral" by rewarding and encouraging healthier individual policy holders to stay with the plan, and maintaining the ability to adjust the size the reward in conjunction with the emerging characteristics of the group.

SUMMARY OF INVENTION

The invention involves a concept of rewarding life insurance policy holders who satisfy requirements relating to insured individuals' wellness. According to one embodiment of the invention, a method for rewarding life insurance policy holders who satisfy requirements relating to insured individuals' wellness includes segmenting a group of insured individuals into a "W" group that qualifies for a wellness benefit (i.e. the Wellness group) and a "S" group that does not qualify for the wellness benefit (i.e. the Standard group). Qualification for the wellness benefit is based on compliance with one or more of the requirements relating to insured individuals' wellness. An aggregate wellness pool is then determined from the aggregate mortality claims experience from groups W and S combined, for distribution to only members of the W group. Alternatively, members of the W group will be deemed to have a more favorable life expectancy profile and thus be eligible for a wellness benefit.

According to one feature of this embodiment, the benefit may include, for example, a cash dividend, a credit towards a premium obligation, additional insurance coverage for a specified time period, or an increase in individual cash value of the policy for members of the W group. It may also include one or more products or services, the use or practice of which increases wellness, such as discounts on medical services available or establishment of and access to a medical expense pool from which members of the W group may obtain funds to cover qualifying medical expenses.

According to another feature of this embodiment, benefits to the members of the W group are distributed based on any determined aggregate savings from the W and S groups, collectively. The wellness benefit may be distributed to each member of the W group based on certain criteria that are indicative of relative expected mortality, as well as other factors such as the member's policy size; the determined aggregate savings; or the expected mortality cost of all members of the W group.

According to still another feature of the invention, "wellness" requirements may include one or more existing health conditions or "results-based requirements", such as the individual's blood pressure, weight and/or heart rate staying within a predetermined range, or the absence of pre-existing life threatening medical conditions. The requirements may also include one or more activity-based requirements, such as a specified diet or exercise regimen, or abstinence from smoking. Activity-based requirements may also include completion of a physician check-up, regardless of the actual examination results.

According to another feature of this embodiment, an overall mortality ratio for the W group and the S group is evaluated, and what satisfies the requirements for inclusion into the W group and its associated wellness benefits is then modified.

According to still another feature of the invention, the segmenting of the groups is performed periodically to determine qualification within a predetermined time interval.

According to another feature of the invention, the aggregate wellness benefits pool is determined using a retrospective analysis by measuring the aggregate mortality claims for the W group and S group collectively against the expected mortality costs established for each individual based on their underwriting classification, issue and attained age, and policy net amount at risk (death benefit less any account value), and summed for the collective group.

According to another feature of the invention, the aggregate wellness benefit pool is determined by a prospective analysis. In this approach, the future life expectancy is estimated for members of the W group and S group based upon mitigating factors for the individuals in the group, such as persistency, health, satisfaction of wellness requirements and so forth. The wellness benefit pool reflects the economic difference between the W group and S group caused by the improvement in the life expectancy.

Other embodiments of the invention include a computer readable storage medium for storing a set of instructions that when implemented perform a method for providing a wellness benefit to life insurance policy holders and a system for rewarding life insurance policy holders who satisfy requirements relating to insured individuals' wellness.

It will be appreciated that the invention provides several benefits, including: improving the individual's health and wellness by encouraging preventative wellness activity; creating economic incentives to better retain the healthy individuals in the insured group, distributing some of the mortality savings back to the individuals in the group demonstrating the wellness activity (i.e. the W group), helping to reduce the aggregate mortality claims ratio; and allocating some of the mortality improvement benefits to a medical expense fund for qualifying individuals (either exclusively to those in the W group, or members of both groups), thereby providing monies to help preserve and improve an individual's life expectancy, further assisting in the creation of improved life expectancies.

In effect, the invention serves to avoid or even potentially turn the "death spiral" upside down by encouraging the healthiest risks to stay in the plan (rather than leaving for a new policy), providing avenues to improve health which in turn creates more mortality savings to re-circulate back to the qualifying group. The invention encourages wellness activities and generally rewards healthier individuals without violating life insurance discrimination rules, both of which serve to help reduce the expected mortality claim ratio (i.e. improve the life expectancy of the entire group of insured individuals).

DETAILED DESCRIPTION OF PREFERRED EMBODIMENTS

The invention involves a concept, which is referred to herein as a "contingent wellness benefit" within an individual life insurance policy. This concept involves a multi-step process designed to generate and distribute value to policyholders that meet a pre-determined measurable "wellness" activity, i.e., an activity expected to promote an individual's heath.

In a general aspect, the present invention provides a system, method, and a computer readable medium storing software that is designed to generate and distribute value to policyholders that meet a pre-determined measurable "wellness" activity.

In one embodiment, the present invention may be applied to facilitate rewarding insured individuals that satisfy specified requirements that may be activity-based and not dependent on the individual's health status, yet has predictive value on maintaining or improving the individual's long term health and well-being. In effect, this embodiment encourages wellness activities and generally rewards the healthier individuals without violating life insurance discrimination rules, both of which serve to help reduce the expected mortality claim ratio and/or improve the prospective life expectancy.

According to a feature of the invention, economic benefits of the improved mortality are re-distributed back to the insured individuals that satisfy the wellness criteria in various forms designed to reward persistency and the wellness activity. For example, such benefits may be re-distributed in the form of funds for medical expenses which further serve to help the mortality experience. However, other manners of re-distributing the economic benefits from the improved mortality may be implemented in accordance with the invention.

Figure 1:
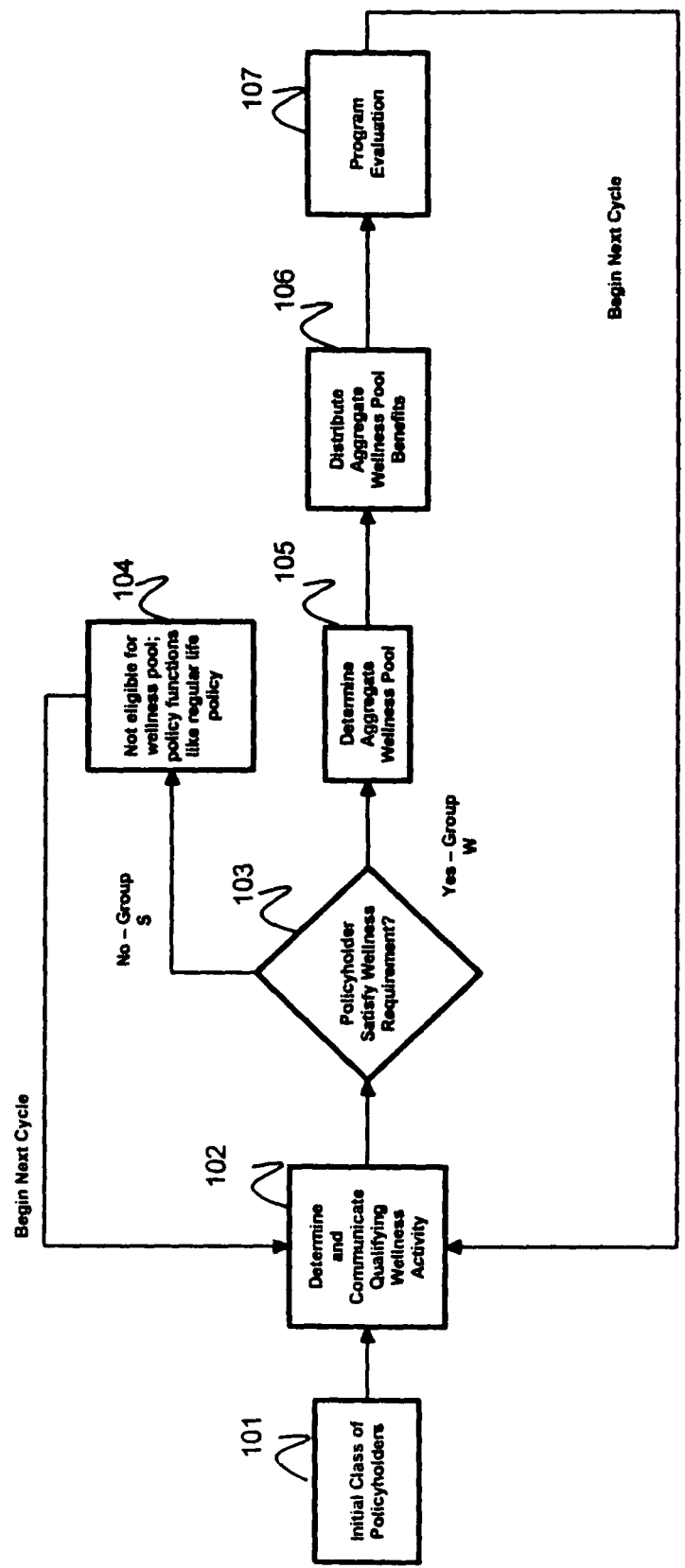
FIG. 1 illustrates a contingent wellness benefit model according to one embodiment of the invention, illustrating major steps and decision points over a single reporting cycle (e.g. one year).

FIG. 1 is a workflow diagram that illustrates the basic segmentation and decision process underlying the contingent wellness benefit model according to an embodiment of the invention. In one embodiment, the process begins at the start of each reporting period (e.g. policy year) with an initial class of policy holders (item 101). At this time, the insurance company determines and communicates one or more requirements that the insured must meet in order to qualify for the wellness distribution (item 102). Preferably, a qualifying activity required has some reasonable expectation of maintaining or improving one's long term health, well-being and in general life expectancy. One example of a qualifying activity is an annual visit to a general physician for a health check-up. Satisfying this qualifying activity may not be dependent on the results of that doctor check-up, but rather be dependent only on the requirement that the check-up occurs. Other activity-based requirements may include certification of compliance with a specified diet regimen; a specified exercise regimen; or abstinence from smoking. Submission of personal health data may also be a qualifying activity where results of the individual's health data does not affect their wellness reward in any way (preferably the insurance company uses the data solely for research purposes). Still other more specific requirements may include results-based tests on existing health conditions, such as blood pressure falling within a predetermined range; heart rate falling within a predetermined range; or absence of pre-existing life threatening medical conditions. The qualification requirements may be guaranteed at policy issue or the insurer could preserve the ability to implement different qualification requirements in the future, depending on regulatory and/or marketplace receptivity.

At the end of the reporting period, one aspect of this process begins by segmenting the individuals within the group into those that qualify for any potential wellness distribution (the W group) and those that do not qualify (the S group) (item 103). This may be understood as a "contingent" aspect of the program participation and significantly distinguishes it from a traditional participating policy's dividend or Universal Life cost of insurance structure. In effect the entire class of policyholders is segmented into two main groups: the wellness group (W group) and the standard group (the S group). Furthermore, the wellness W group may be divided further into sub-classes with each sub-class having certain specified qualifications. In this example, the standard group utilizes a traditional participating policy's dividend or Universal Life cost of insurance structure (item 104). Individuals can switch from one group to the other each year and even switch among sub-classes within the W group (or specified number of years if the qualification test period is longer than one year), dependent only on whether they have satisfied the wellness-based activity for that determination point. In the current industry structures all individuals in the same underwriting class receive proportional dividends (par policies) or proportional adjustments to COI charges (non-par UL).

One feature of this embodiment of the invention is establishing a process and method to adjust the annual (or periodic if other than annual) qualifications based on emerging medical research. Similarly, for marketing purposes the qualification requirements may need to be established at policy issue and guaranteed for the life of the policy. In this situation, the process for adjusting the qualifications based on emerging medical research may only apply to new cohorts of business.

A next step involves determining the aggregate wellness benefit pool available for distribution to the qualifying members (item 105). This determination can be done retrospectively or prospectively. The company may use internal data (e.g. policy persistency, proportion of the block satisfying various qualification criteria) and/or external data (e.g. new cures for major diseases, potential emerging pandemics) to determine the appropriate wellness benefit pool for current period distribution to qualifying policyholders. In this process, the measuring period could be annual cycles if the size of the group was statistically significant, multi-year cycles, or a hybrid approach (e.g., multi-year cycles initially and then moving toward annual cycles).

Figure 2A:
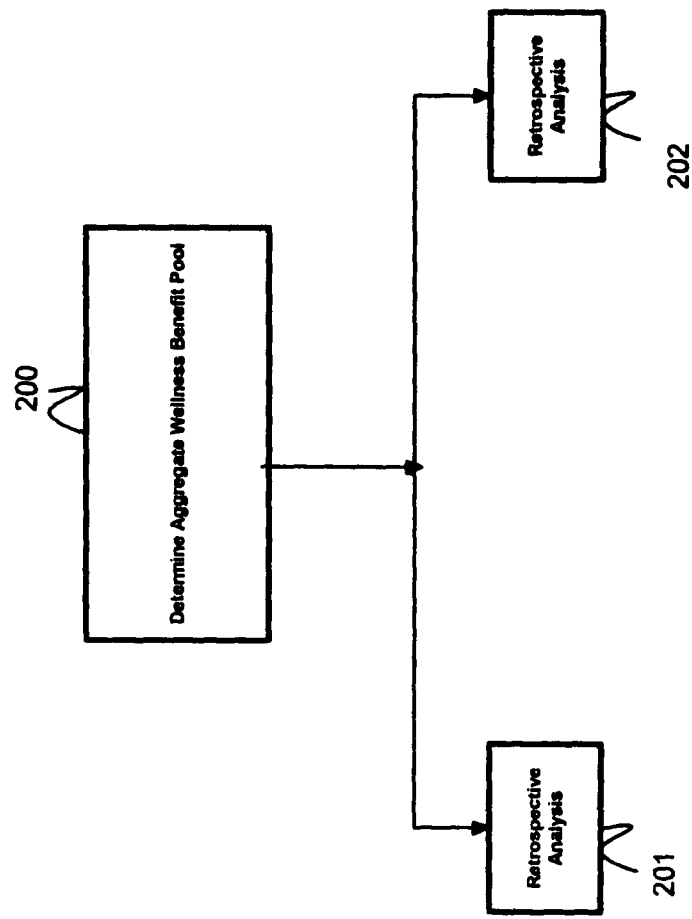
FIG. 2A illustrates an example of how the aggregate wellness benefit pool is determined in accordance with certain embodiments of the invention.

FIG. 2A further illustrates how a determination of the aggregate wellness benefit pool available for distribution can be done. (item 200) One implementation of determining the aggregate wellness benefit utilizes a retrospective analysis. (item 201) Specifically, the combined group W and group S's aggregate mortality claims are measured against the pure mortality costs charged (e.g. expected in product pricing) to the combined group. This may be based on the expected mortality rate established at policy issue (or the last time the policy was re-priced and premiums or COI charges were revised, if later) for each individual policy in each group and summed for the entire combined group. To the extent the actual mortality claims are less than that charged to the collective individuals in the combined group, there will be a wellness benefit pool available for distribution to qualifying policyholders.

Alternatively, the aggregate wellness benefit may utilize a prospective analysis. (item 202) In this implementation, the aggregate wellness benefit pool is determined by estimating the prospective life expectancy for the W group and S group separately and collectively based upon mitigating factors for the individuals in the group, such as persistency of each group, overall health, frequency of doctor visits, frequency of exercise, and many factors included in the wellness requirements. To the extent an economic benefit is derived from an improvement in life expectancy, there will be a wellness benefit pool available for distribution to qualifying policyholders.

It is important to note that segmenting the individuals within the group into those that qualify for any potential wellness distribution (the W group) and those that do not qualify (the S group) (item 103) and determining the aggregate wellness benefit pool available for distribution to the qualifying members (item 105) are interchangeable steps in the model. In some instances, it may be preferably to segment the initial class of policyholders based upon the size of the aggregate wellness pool. In other cases, it may be preferably to determine the aggregate wellness pool after segmenting the initial class of policyholders.

A next step includes determining how to distribute the wellness benefit pool declared for distribution (item 106). With the goal of improving health and wellness and rewarding those that met the qualifying wellness activity requirements, there are multiple ways to accomplish this. Experience over time may be utilized to determine the optimal distribution method.

Figure 2B:
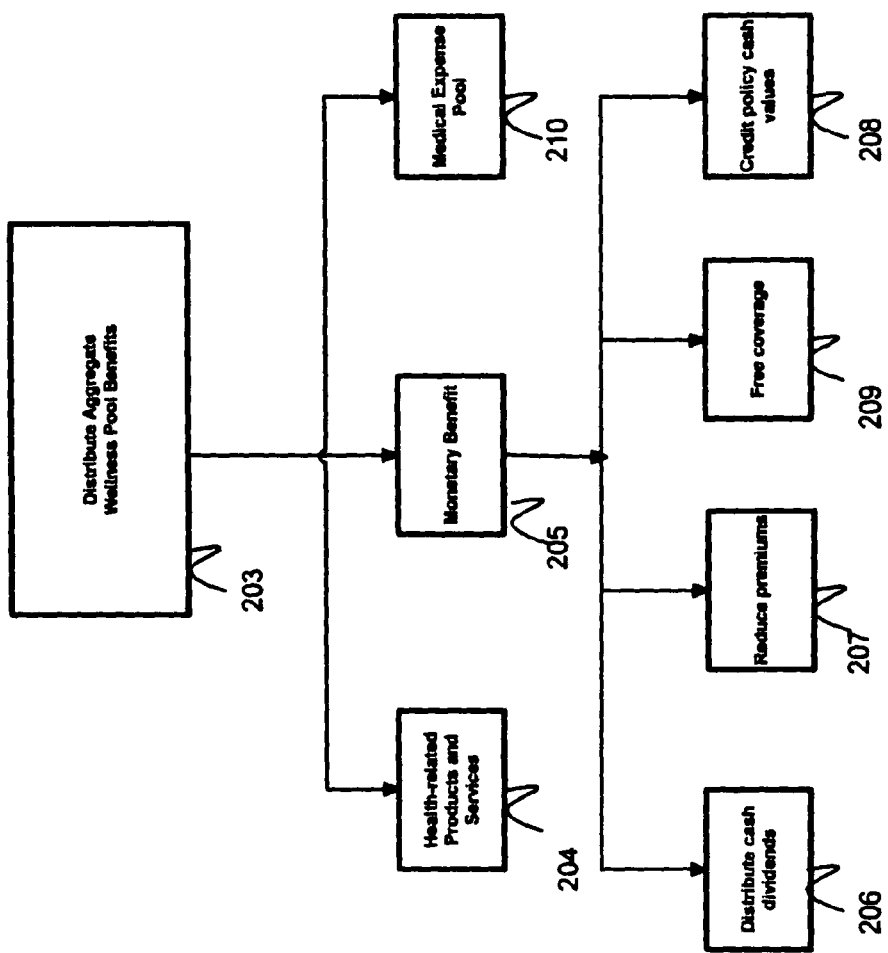
FIG. 2B illustrates an example of how the aggregate wellness benefit pool is distributed in accordance with certain embodiments of the invention.

FIG. 2B details several possible techniques to distribute the aggregate wellness pool benefits that may be utilized (item 203). These techniques can be used separately or in combination to distribute the aggregate wellness pool benefits. For example, funds from the wellness pool are utilized to provide wellness products and services either free of charge or make available at discounts to standard retail prices (item 204). This encourages insured individuals to use the available products and services since the cost is subsidized by the wellness pool. Alternatively, funds may be distributed from the wellness pool as monetary benefits (item 205). For example, the funds may be distributed in the form of cash dividends (item 206), reduction in premiums (item 207), credits to the policy cash values (item 208), or in the form of free additional insurance coverage for a specified time period (item 209). This provides immediate financial reward to those satisfying the wellness activity qualification. Another alternative is to distribute wellness pool funds into a "medical expense pool," whereby these funds are available to help cover medical-related expenses (item 210). This would help pay for medical expenses and directly serve to improve life expectancy. These funds from the aggregate wellness pool benefits could be made available only for the W group or both the W and S group. The funds would then be distributed to those who are eligible to receive the funds.

Distributing the aggregate wellness pool benefits to those eligible members involves determining how to allocate the funds to the individual policies. The process involves a distribution technique, whereby the funds are distributed to the qualifying members based on certain criteria that are indicative of relative expected mortality, as well as other factors such as the member's policy size; the determined aggregate savings (retrospective) or improvement in life expectancy (prospective); or the expected mortality cost of all members of the W group.

Another step in the wellness benefit model may include a program evaluation process (item 107). The overall mortality ratio for the entire group (the W and S groups combined) is evaluated against expectations and benchmarks. The qualifying activity or activities are re-evaluated in light of the percentage of eligible policyholder's qualifying for the W group, new medical research on effectiveness of specified wellness activities, etc. Customer satisfaction and utilization in regards to the distribution of the wellness and medical expense pool would also be evaluated. Any required changes would be made and the process would restart for the next measurement period.

Figure 3:
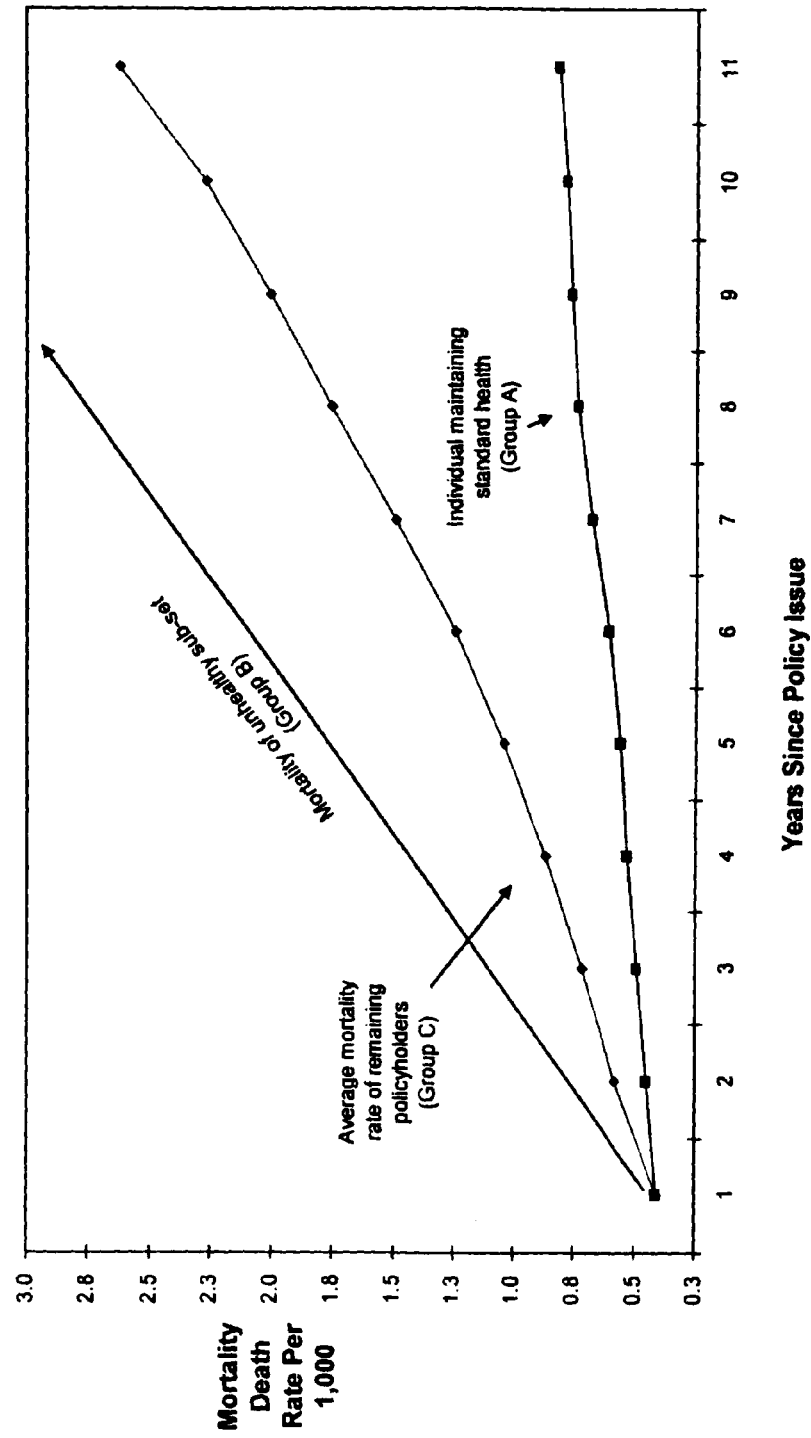
FIG. 3 is a graphical description of a typical mortality rate model for life insurance. The graph illustrates the mortality rate progression over time for the composite set of insured individuals (group C), the individuals maintaining standard health (group A), and the unhealthy sub-set (group B).

By way of illustration, FIG. 3 is a chart illustrating the typical progression of mortality rates per 1000 over time since a life insurance policy was originally underwritten and issued to individuals in a specific underwriting class and issue age. Four major dynamics are occurring in the model. First, some individuals will maintain their health at the same underwriting class as it existed when they purchased the policy. This sub-set of individuals is represented by group A. Those policyholders in this group may also have to satisfy certain results-based and activity-based requirements. Their mortality rate increases slightly every year because aging naturally increases the likelihood of dying.

Second, some individuals will have deteriorating health over time. This sub-set of individuals is represented by group B and clearly has the highest probability of death.

Third, some individuals will terminate their policy coverage either through voluntary lapse or death. Consequently these individuals cease to be a part of the group being insured.

Fourth, group C, the composite mortality rate, represents the weighted average of the mortality rate exhibited by the healthy sub-set (illustrated by group A) and the unhealthy sub-set (illustrated by group B). In reality the risk status will be a spectrum from the very healthiest to the unhealthiest with each sub-set garnering a relative weight. The emerging mortality rate of the various sub-sets, combined with the persistency of each sub-set, ultimately make up group C's mortality rate.

To the extent a business model can influence the mortality rate of the various sub-sets as well as keep relatively more of the healthiest risks (with the lowest mortality rates), the overall mortality (i.e. group C) of the group will decline.

Figure 4:
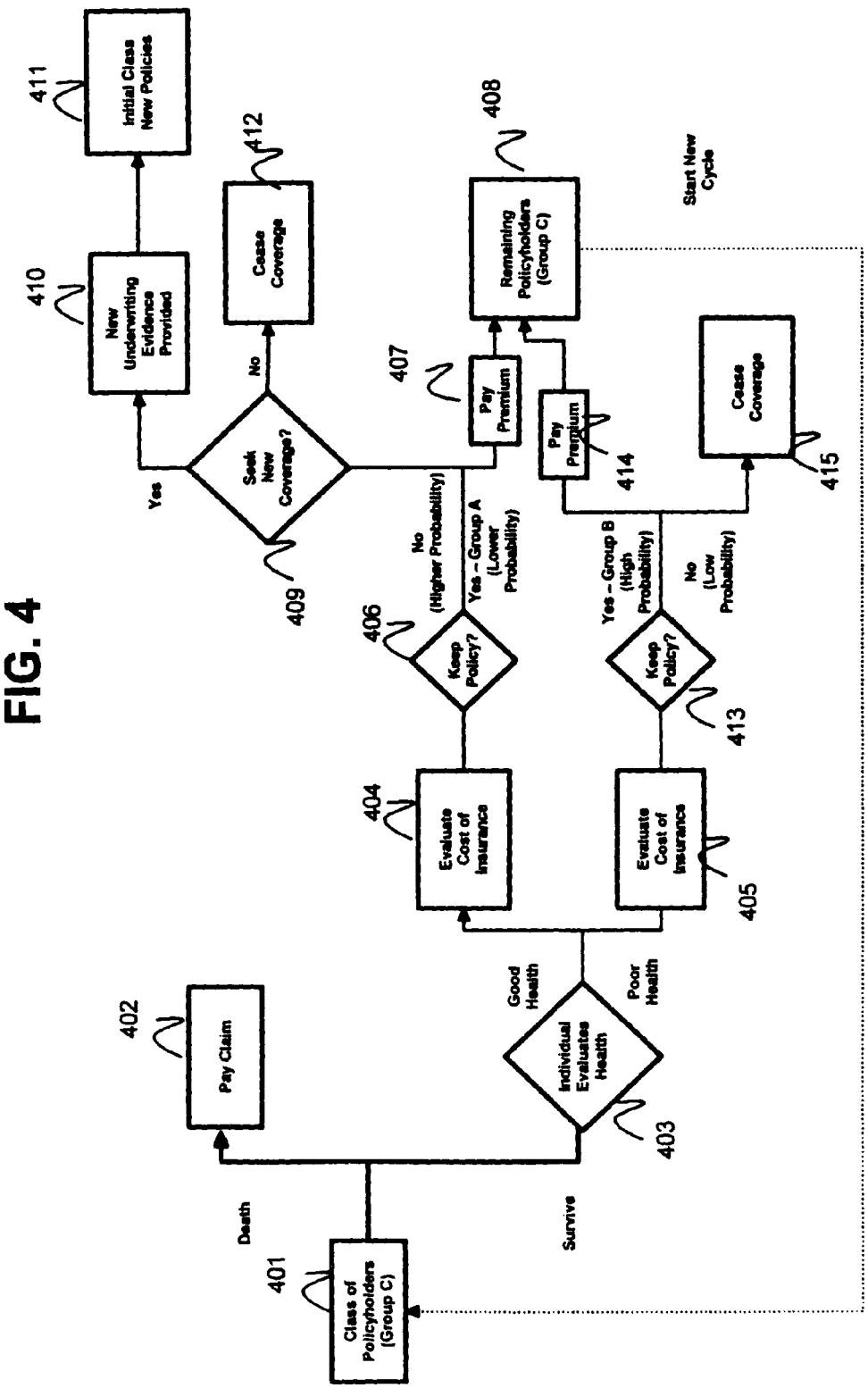
FIG. 4 is an illustration of the consumer decision tree in the life insurance buying and retention process, documenting the key decision points and alternative outcomes in whether the insured ultimately keeps their existing policy, replaces the coverage with a new policy, or terminates insurance coverage entirely.

FIG. 4 depicts a consumer decision process for life insurance. The process starts with a class of policyholders (group C) (item 401). If this is a new class of policies that had just been underwritten and assigned the same risk class, they would all be considered group A policies from FIG. 2. Otherwise, at any other given point after the purchase point this class of policyholders is considered group C, a weighted mix of group A (healthy sub-set) and group B (relatively unhealthy sub-set).

A cycle could be any length of time, but is expected to typically be a 12 month reporting period. In any given cycle the policyholder either dies and a claim is paid to the beneficiary (item 402), or the policyholder survives (item 403). Assuming survival, the insured evaluates their health situation and the cost of the insurance coverage (items 404 and 405). The decision process works as follows:

First, if the individuals are in good health and they decide to keep the existing policy (item 406), they will pay the insurance premium (item 407) and remain in group A and become a part of the larger group C (item 408). A new reporting cycle will begin. It is noted on the chart this scenario has a somewhat lower probability of occurring over time since their good health status will ultimately encourage them to seek a newer coverage at a lower cost.

Second, if the individuals are in good health and decide they do not want to keep their existing coverage at the price being charged, they need to make a decision whether or not to seek new coverage. If they decide to seek new coverage (item 409), they will need to submit new underwriting evidence (item 410). Once submitted and approved, they will be placed into a new class of policies (item 411). If they decide not to seek new coverage, their coverage will cease (item 412).

Third, if the individuals are in poor health and they decide to keep their existing policy (item 413), they will pay their insurance premium (item 414) and thus remain in group B and become a part of the larger group C (item 408). It is noted on the chart there is a high probability they will make this decision since it is economically advantageous to keep the policy due to their poor health status.

Finally, if the individuals are in poor health but decide to drop their existing policy, their coverage will cease and they will drop out of the group (item 415). Given this is an unsound decision, it has a low probability.

As each reporting cycle is repeated, there is a growing likelihood of dispersion in the individual health situations, as well as a greater likelihood that the individuals in good health will find it advantageous to seek a new policy.

Figure 5:
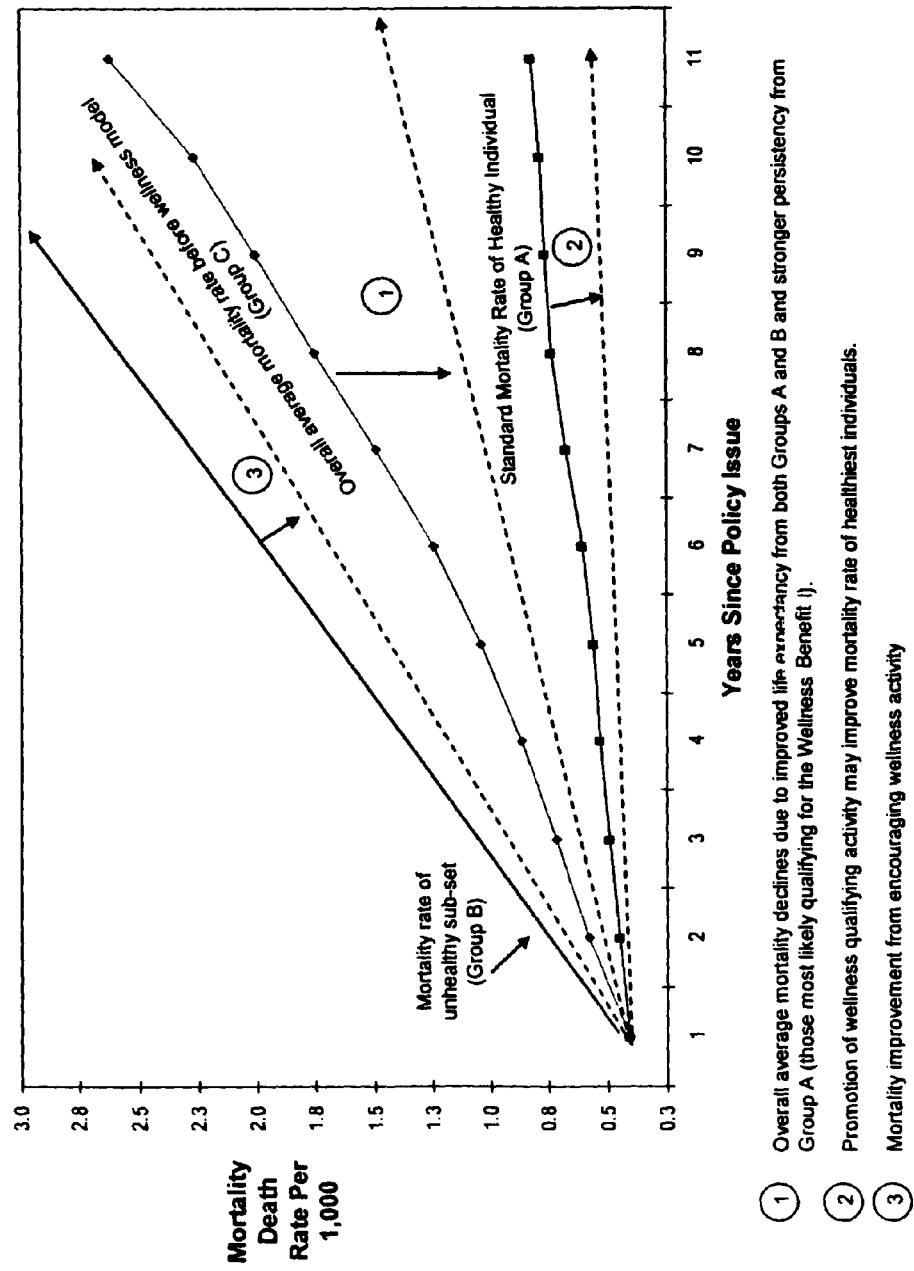
FIG. 5 illustrates the impact of the contingent wellness benefit model over time on the mortality rates for the three major groups (the composite group, the standard health subset and the unhealthy sub-set).

FIG. 5 is a chart that depicts the general impact to the emergence of mortality ratios for the three major groups (first described in reference to FIG. 3) from a contingent wellness benefit model pursuant to an embodiment of the invention.

Starting with group B, this sub-set represents the sub-set of individuals whose health has deteriorated since the life insurance policy was issued. In theory, the promotion of wellness products and services and the economic incentive from financially participating in the wellness benefit pool may ultimately improve the average mortality rate for this sub-set. Those policyholders in group B may be motivated to satisfy the wellness results and activity requirements in order to have these promotions available to them. The general improvement in mortality rate is illustrated by the dotted line under point 3.

Group A represents the standard mortality rate for individuals still remaining in the group but their health has remained at the standard risk class (i.e. no change since policy issue). Since this is the healthiest sub-set of individuals, it is not likely the promotion of wellness products and services and the wellness benefit pool incentive will materially change their behavior. It is more likely these individuals are already practicing a healthier lifestyle. Nonetheless, given the relatively low death rates expected over a several year cycle it only takes the saving of one death claim to have a material impact on the overall average mortality rate Furthermore, the wellness benefit would be expected to increase the persistency of group A. The dotted line below the point 2 footnote represents a hypothetical improvement in mortality rates for this sub-set.

Group C represents the composite mortality rate for all individuals remaining in the insured group. In effect this graph represents a weighted average of all the various health risk sub-sets remaining in force. Clearly improving the mortality rate of the various sub-sets will improve the average mortality rate of group C. An equally important factor in lowering the overall mortality ratio is preserving more of the healthy lives represented by group A. The greater the weight given to group A, the closer group C mortality rates will be drawn down to the level of group A.

To the extent overall average mortality rates in group C are reduced, this finances the wellness benefit pool described in FIG. 1. A properly designed process to segment the entire group via the qualifying wellness activity establishes a process to direct these economic benefits from mortality improvement to the insured individuals that are likely to be in group A (i.e. those demonstrating wellness behaviors). By directing these funds to the individuals most likely in group A further strengthens their health and persistency which further drives down the overall mortality ratio. The net effect is the avoidance and possibly reversal of the death spiral typically seen in traditional life insurance business models.

It will be appreciated that the present invention may be implemented with a computer or computer based network. Thus, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In addition to a system, the invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and Web implementations of the present invention could be accomplished with standard programming techniques with rule based logic and other logic to accomplish the various database searching steps, correlation steps, comparison steps and decision steps. It should also be noted that the words "component" or "module" as used herein and in the claims is intended to encompass implementations using one or more lines of software code, and/or hardware implementations, and/or equipment for receiving manual inputs.

Figure 6:
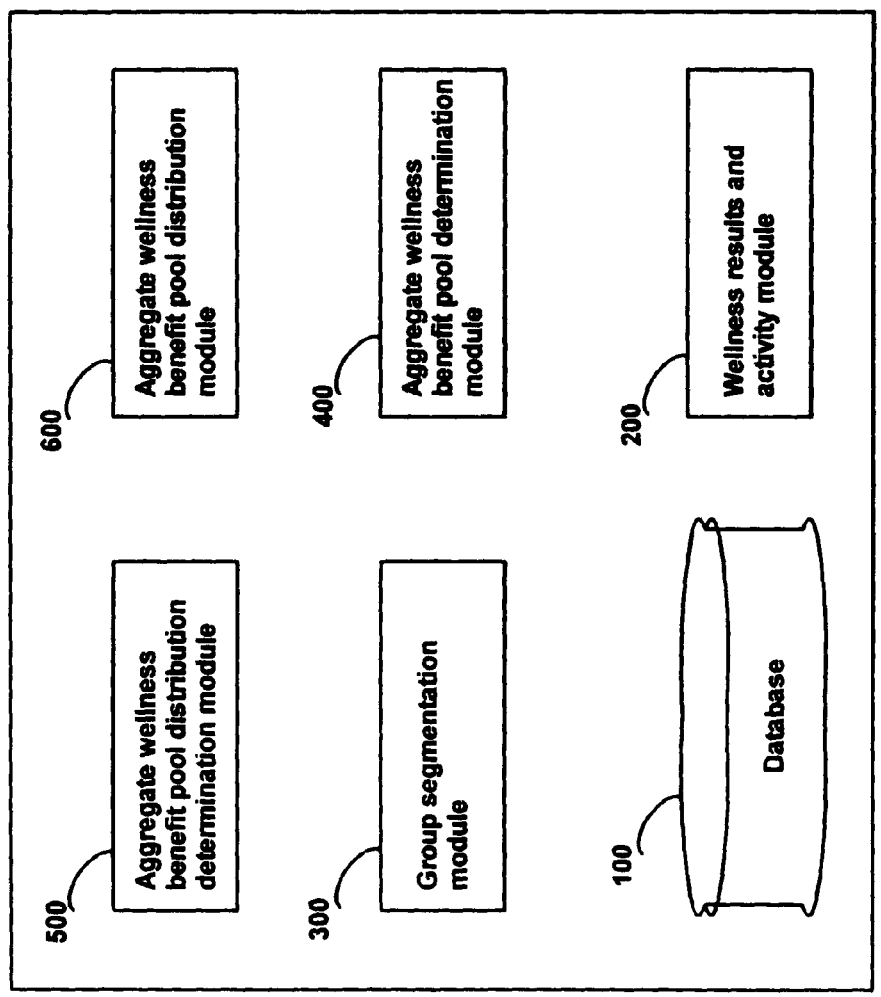
FIG. 6 is a diagram that illustrates the basic segmentation and decision process underlying the contingent wellness benefit model according to a computer-implemented embodiment of the invention.

FIG. 6 is a diagram that illustrates the basic segmentation underlying the contingent wellness benefit model according to a computer-implemented embodiment of the invention. The contingent wellness benefit model illustrated in this embodiment includes several functional components and services that will be described in further detail below. In this example, these components include but are not limited to a database 100, a wellness results and activity requirements module 200, a group determination module 300, an aggregate wellness benefit pool determination module 400, an aggregate wellness benefit pool distribution determination module 500, and a aggregate wellness benefit pool distribution module 600. The database 100 can be implemented in software and/or Web applications residing on hardware with standard programming techniques. Preferably, the database 100 is housed on a distinct computer such as a database server. The modules (200, 300, 400, 500, and 600) encompass implementations using software code, and/or hardware implementations, and/or equipment for receiving manual inputs. One or more modules/interfaces may be stored and executed on hardware such as for example, an application server.

According to one embodiment of the invention, the contingent wellness benefits model is implemented using industry-standard/open-source Web-based technologies to provide for rapid development and ease of customization. According to one embodiment of the invention, the contingent wellness benefits model is built on top of a relational database 100 (e.g., mySQL, Oracle, or SQLServer).

According to one embodiment of the invention, the database 100 provides a schema that is utilized to store data that is utilized to determine aggregate wellness benefits and distribution of those benefits. Preferably, the database 100 is an industry-standard relational Database Management System (DBMS). The database 100 stores data concerning the policyholders as well as the wellness results and activity requirements.

An example of some information that is stored in the database includes, but is not limited to, policyholder personal information and information regarding whether the policyholder satisfies the wellness results and activity requirements. The policy holder personal information may include information such as name, address, date of birth, length of policy, and so forth. The policyholder requirements information may include information such as the date of the last doctors visit, the existence of a gym membership, the policyholder's blood pressure, weight, at rest heart rate, and so forth.

According to one embodiment of the invention, the contingent wellness benefit model includes a wellness results and activity requirements module 200. At the beginning of any reporting cycle, the insurance company determines and communicates the wellness activity or activities required over the upcoming cycle (e.g. 12 months) to qualify for any wellness benefit distributions. Note that while this workflow diagram assumes the qualifying activities could change annually or periodically, the invention is not necessarily dependent on the flexibility. Consumer desire for certainty may dictate that the activities be held consistent year-after-year.

According to one embodiment of the invention, the contingent wellness benefit model includes a group segmentation module 300. At the end of the cycle, the company checks the database to see if the policyholder satisfied the wellness result and activity qualifications. Any policyholders (in either group W or S) may be eligible for inclusion in the wellness group W, if the wellness result and activity qualifications for that policyholder are satisfied. If not, that individual is not eligible for any distributions from the wellness pool for that cycle and would be in the standard group S. Their policy will then function just like any other life insurance policy. If the qualification requirement is satisfied, the policyholder in Group W is eligible for the wellness benefit.

According to one embodiment of the invention, the contingent wellness benefit model includes an aggregate wellness benefit pool determination module 400. The company proceeds to determine the wellness benefit pool based on either retrospective or prospective analysis, as described above. To the extent the actual or estimated mortality claims are less than that charged to the collective individuals in the combined group, there will be a wellness benefit pool available for distribution.

In this process the measuring period could be annual cycles if the size of the group was statistically significant, multi-year cycles, or a hybrid approach (e.g., multi-year cycles initially and then moving toward annual cycles). In addition, the company may use other internal data from the database (e.g. policy persistency, proportion of the block satisfying various qualification criteria) and/or external data (e.g. new cures for major diseases, potential emerging pandemics) to determine the wellness benefit pool available for distribution to qualifying policyholders.

According to one embodiment of the invention, the contingent wellness benefit model includes an aggregate wellness benefit pool distribution determination module 500. Once the aggregate wellness benefit pool is determined, the mortality pool is segmented into sub-pools for potential ways of distributing back to the targeted group. In the chart it was assumed the wellness pool is partly distributed in cash and partly used to fund a medical expense fund. Numerous methods in which these funds could be distributed were detailed above, including, but not limited to, providing financial rewards only to those in Group W, promoting wellness products and services to the entire group of policyholders free of charge or at discounts, or covering medical-related expenses of policyholders.

According to one embodiment of the invention, the contingent wellness benefit model includes a aggregate wellness benefit pool distribution module 600. This module finalizes the list of individuals eligible for medical or expense reimbursement and the amount of expense the particular individual is eligible for. The process involves a distribution technique whereby the funds are distributed to the qualifying members based on certain criteria that are indicative of relative expected mortality, as well as other factors such as the member's policy size; the determined aggregate benefit pool; or the expected mortality cost of all members of the W group. For example, cash can be pulled from the medical expense fund and distributed.

The last step in the process at the end of each cycle is similar to the first step, and utilizes the same wellness results and activity requirements module 200 to evaluate the program in its entirety. The module again determines if any changes need to be made to the wellness result and activity requirements, and communicate such changes to begin a new cycle.

Figure 7:
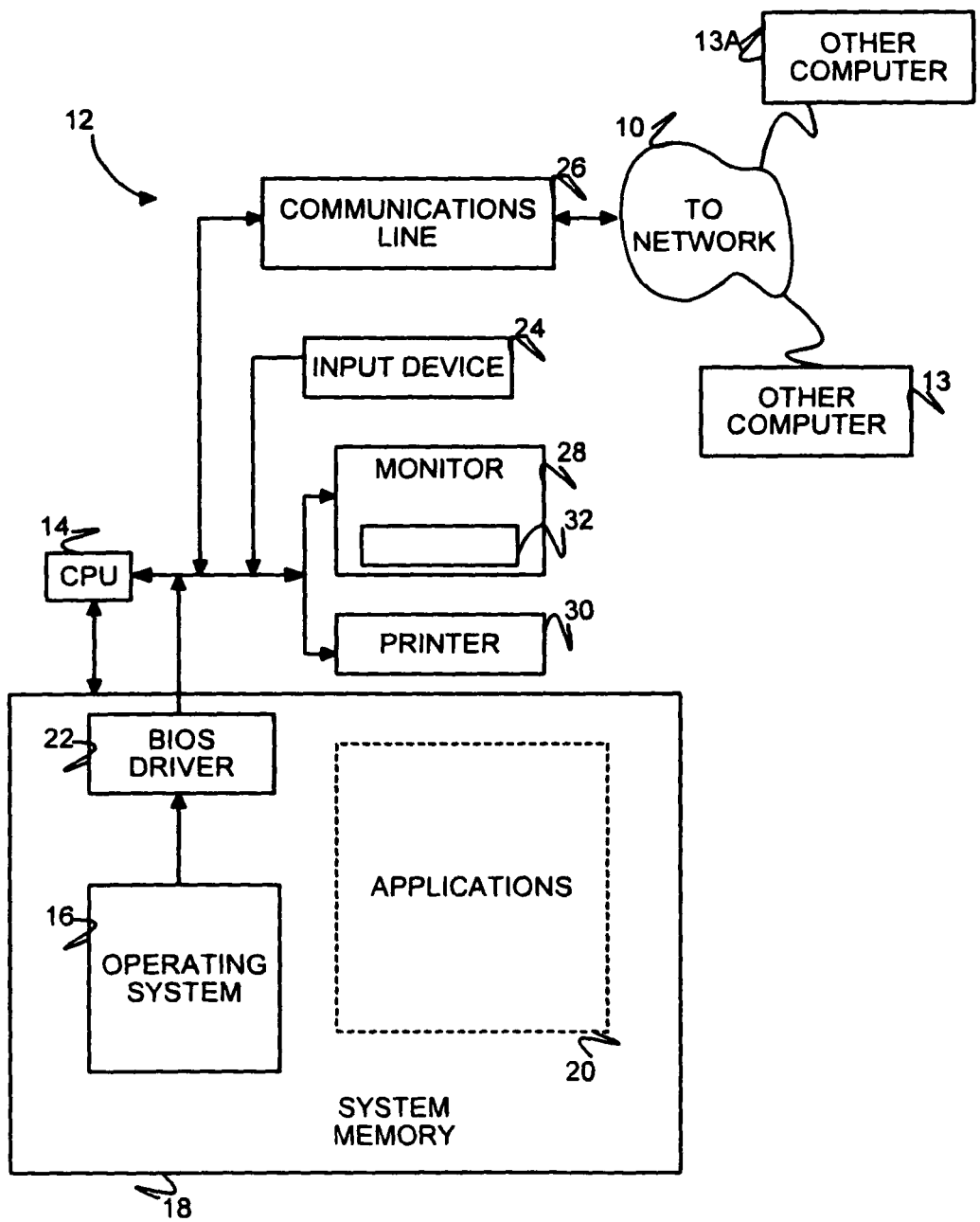
FIG. 7 illustrates the components of a general purpose computing system connected to a general purpose electronic network, such as a computer network that can be utilized for the contingent wellness benefit model.

FIG. 7 illustrates the components of a general purpose computing system connected to a general purpose electronic network 10, such as a computer network. The computer network can be a virtual private network or a public network, such as the Internet. As shown in FIG. 1(*a*), the computer system 12 includes a central processing unit (CPU) 14 connected to a system memory 18. The system memory 18 typically contains an operating system 16, a BIOS driver 22, and application programs 20. In addition, the computer system 12 contains input devices 24 such as a mouse or a keyboard 32, and output devices such as a printer 30 and a display monitor 28, and a permanent data store, such as a database 21. The computer system generally includes a communications interface 26, such as an ethernet card, to communicate to the electronic network 10. Other computer systems 13 and 13A also connect to the electronic network 10 which can be implemented as a Wide Area Network (WAN) or as an internetwork, such as the Internet. Data is stored either in many local repositories and synchronized with a central warehouse optimized for queries and for reporting, or is stored centrally in a dual use database. This system is one example of a system that could execute the contingent wellness benefit modules of FIG. 6.

The foregoing description of preferred embodiments of the invention have been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A computer implemented method for rewarding existing life insurance policy holders who satisfy one or more activity-based requirements or weight requirements, comprising:
   segmenting a group of insured individuals possessing existing life insurance policies into group W that qualifies for a wellness benefit and group S that does not qualify for the wellness benefit, wherein qualification for the wellness benefit is based on compliance with said one or more of activity-based requirements, or based on compliance with said weight requirements; and
   determining an aggregate wellness benefit pool based either retrospectively on a combined mortality experience for group W and group S, or prospectively on a combined life expectancy for group W and group S,
      wherein the aggregate wellness benefit pool is available for distribution to members of group W, and
      wherein said segmenting and said determining operations are performed by one or more programmed computer devices.

2. The method of claim 1, further comprising distributing a benefit to the members of group W based on any determined aggregate mortality benefit pool from group W and group S combined.

3. The method of claim 1, wherein said one or more activity-based requirements include certifying compliance with at least one of a specified diet regimen, a specified exercise regimen, and abstinence from smoking.

4. The method of claim 1, wherein said one or more activity-based requirements include at least one of completion of a physician check-up and submission of personal health data.

5. The method of claim 1, further comprising:
   evaluating an overall mortality ratio for group W and group S combined, and
   modifying said requirements for inclusion in group W and thus subsequent distribution of the wellness benefit based on the overall mortality ratio for group W and group S combined.

6. The method of claim 1, wherein the aggregate wellness benefit pool is determined retrospectively by measuring actual aggregate mortality claims for group W and group S combined against expected mortality costs of the individual policies in group W and group S, based on expected mortality rates established when a life insurance policy was underwritten.

7. The method of claim 1, wherein the aggregate wellness benefit pool is determined prospectively by measuring actuarial present value of future expected mortality claims for group W and group S combined against that expected based on mortality tables consistent with when a life insurance policy was underwritten.

8. The method of claim 1, wherein the wellness benefit is distributed to members of group W in the form of one or more of the following: a cash dividend; a reduction in premium; free additional insurance coverage for a specified time period; or an increase in individual cash value of the life insurance policy for members of group W.

9. The method of claim 1, wherein the wellness benefit comprises one or more products or services, the use or practice of which increases one's general health and wellness.

10. The method of claim 1, wherein the wellness benefit comprises one or more of: discounts on medical services available to members of group W; and establishment of and access to a medical expense pool from which members of group W may obtain funds to cover qualifying medical expenses.

11. The method of claim 1, wherein the aggregate wellness benefit pool is distributed to each member of group W based on criteria that are indicative of relative prospective mortality.

12. The method of claim 1, wherein the wellness aggregate benefit pool is distributed based on one or more of: member's expected mortality cost; aggregate savings to be distributed to the members of group W; or expected mortality cost for all members of group W collectively.

13. An article of manufacture including a non-transitory computer-readable medium having instructions stored thereon that, if executed by a computing device, cause the computing device to perform operations comprising:
   segmenting a group of insured individuals possessing existing life insurance policies into a group W that qualifies for a wellness benefit and a group S that does not qualify for the wellness benefit, wherein qualification for the wellness benefit is based on compliance with one or more activity-based requirements, or based on compliance with weight requirements; and
   determining an aggregate wellness benefit pool based either retrospectively on a combined mortality experience for group W and group S or prospectively on a combined life expectancy for group W and group S,
      wherein the aggregate wellness benefit pool is available for distribution to members of group W.

14. The article of manufacture of claim 13, wherein the wellness benefit is distributed to the members of group W based on any determined aggregate mortality benefit pool from group W and group S combined.

15. The article of manufacture of claim 13, wherein the aggregate wellness benefit pool is determined retrospectively by measuring actual aggregate mortality claims for group W and group S combined against expected mortality costs for those individuals based on mortality ratios established when a life insurance policy was underwritten.

16. The article of manufacture of claim 13, wherein the aggregate wellness benefit pool is determined prospectively by measuring actuarial present value of future expected mortality claims for group W and group S combined against that expected based on mortality tables consistent with when a life insurance policy was underwritten.

17. The article of manufacture of claim 14, wherein the wellness benefit comprises one or more of the following: a cash dividend, a reduction in premium, free additional insurance coverage for a specified time period, and an increase in individual cash value of the policy benefits for members of group W.

18. The article of manufacture of claim 14, wherein the wellness benefit comprises one or more products or services, the use or practice of which increases wellness.

19. The article of manufacture of claim 14, wherein the benefit comprises one or more of: discounts on medical services available to members of group W; and establishment of and access to a medical expense pool from which members of group W may obtain funds to cover qualifying medical expenses.

20. The article of manufacture of claim 14, wherein the aggregate wellness benefit pool is distributed based on one or more of: member's expected mortality cost; determined aggregate mortality savings; and collective expected mortality cost of all members of group W.

21. The article of manufacture of claim 13, wherein the one or more activity-based requirements include certifying compliance with at least one of a specified diet regimen, a specified exercise regimen, and abstinence from smoking.

22. The article of manufacture of claim 13, wherein the one or more activity-based requirements include completion of a physician check-up or submission of personal health data.

23. The method of claim 1, further comprising dividing the group W that qualifies for a wellness benefit into sub-classes, wherein each sub-class has a different activity-based or weight-based requirement necessary for qualification, and wherein the aggregate benefit pool is available for members of each sub-class.

24. The article of manufacture of claim 13, wherein the operations further comprise dividing the group W that qualifies for a wellness benefit into sub-classes, wherein each sub-class has a different activity-based or weight-based requirement necessary for qualification, and wherein the aggregate benefit pool is available for members of each sub-class.

25. The method of claim 1, wherein the activity-based requirements require the member to conduct a certain task related to improving their long term health and are not based on their current health status.

26. The article of manufacture of claim 13, wherein the activity-based requirements require the member to conduct a certain task related to improving their long term health and are not based on their current health status.

* * * * *

UNITED STATES PATENT AND TRADEMARK OFFICE
CERTIFICATE OF CORRECTION

| | | |
|---|---|---|
| PATENT NO. | : 8,515,785 B2 | Page 1 of 1 |
| APPLICATION NO. | : 11/898752 | |
| DATED | : August 20, 2013 | |
| INVENTOR(S) | : Clark et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 283 days.

Signed and Sealed this
Seventeenth Day of February, 2015

Michelle K. Lee
*Deputy Director of the United States Patent and Trademark Office*